Dec. 4, 1956 M. M. JOHNSON Re. 24,249

RAILWAY JOURNAL BOX STABILIZER

Original Filed April 18, 1952

INVENTOR.

Milton M. Johnson

BY Victor J. Evans & Co.

ATTORNEYS

United States Patent Office

Re. 24,249
Reissued Dec. 4, 1956

24,249

RAILWAY JOURNAL BOX STABILIZER

Milton M. Johnson, Temple, Tex.

Original No. 2,704,694, dated March 22, 1955, Serial No. 283,104, April 18, 1952. Application for reissue November 23, 1955, Serial No. 548,797

6 Claims. (Cl. 308—40)

Matter enclosed in heavy brackets [ ] appears in the original patent but forms no part of this reissue specification; matter printed in italics indicates the additions made by reissue.

This invention relates to journal boxes of railway car trucks in which the ends of axles on which the wheels of the cars of the train are mounted are journaled in the truck, and in particular a pair of shoes of journal material removably mounted in the sides of a journal box and positioned to engage opposite sides of the end of an axle positioned in the journal box.

The purpose of this invention is to provide means in a journal box for retaining an axle in alignment with the conventional journal brass *or bearing* on the upper side of the axle and positioned below the brass wedge of the journal box.

Various devices have been provided for taking the lateral thrust of an axle in a journal box but there has been no device provided to prevent an upward motion of the journal box which, when such upward motion happens allows the brass to raise up off the journal and allows fragments of the waste packing and other foreign particles to get between the brass and the journal which causes the box to run hot; however, devices of this type require modifications in the journal box and for this reason use thereof is limited. With this thought in mind this invention contemplates a pair of brass shoes removably mounted in opposite sides of a journal box with the shoes positioned below the center line of the axle to receive lateral thrust of an axle and prevent the upward vertical motion of the box therein and wherein the mounting means for the shoes is adapted to be installed in journal boxes of conventional design.

The object of this invention is, therefore, to provide mounting shoes of bearing material in the sides and below the center line of the axle of a journal box of a railway truck wherein the shoes are positioned to receive lateral thrust and to prevent upward vertical motion of the journal box of an axle journaled in the box and whereby the shoes are adapted to be used without changing the box.

Another object of the invention is to provide mounting means for stabilizing shoes of railway journal boxes whereby journal boxes now in use may be equipped with said shoes.

A further object of the invention is to provide stabilizing shoes and mounting means therefor wherein the parts are adapted to be installed in journal boxes of railway cars and wherein the parts are of a simple and economical construction.

With these and other objects and advantages in view the invention embodies a U-shaped frame having arms extended from the ends of a cross bar with beveled surfaces provided on the inner edges of the arms and a shoe of bearing material having side surfaces beveled to correspond with the bevel on the inner surfaces of the arms of the mounting frame and having an arcuate side surface in which the side surface is formed to correspond with the curvature of a flange on the end of a railway car axle.

Other features and advantages of the invention will appear from the following description taken in connection with the drawings wherein.

Figure 1:
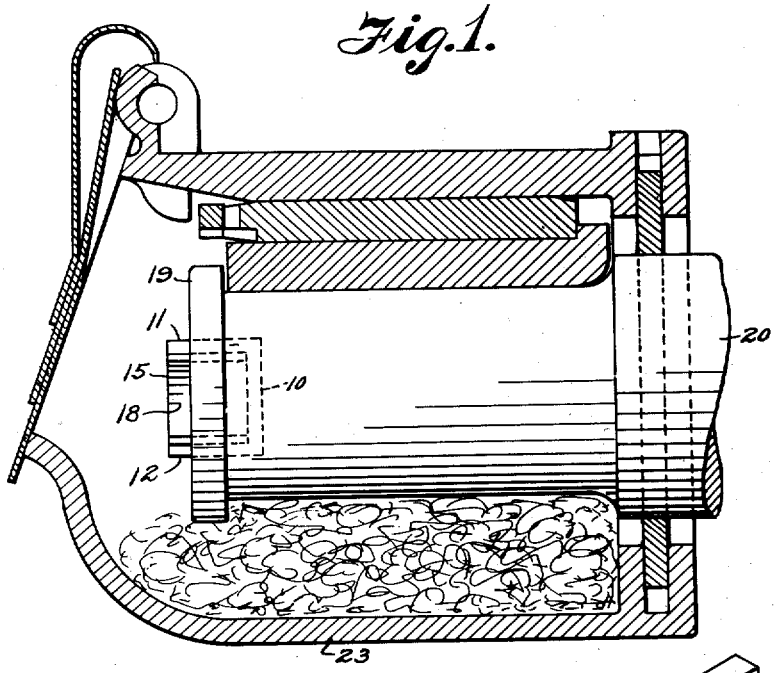
Figure 1 is a longitudinal section through a journal box illustrating the relative position of the parts and showing the improved stabilizing shoe of this invention position to receive a flange on the end of an axle extended into the journal box.
Figure 2:
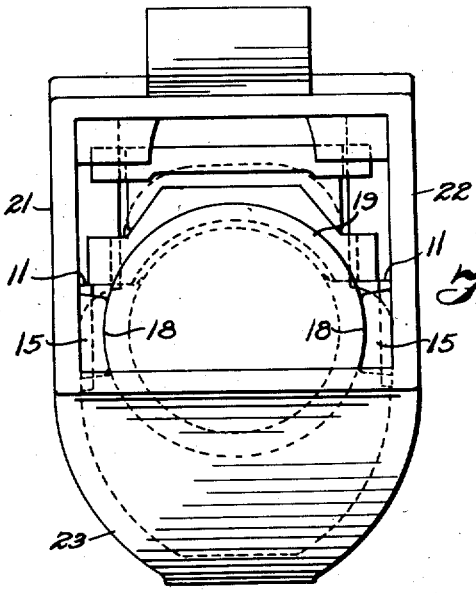
Figure 2 is an end elevational view of the journal box as shown in Fig. 1 with the cover plate omitted and also showing the stabilizing shoes in combination with the flange on the ends of the axle.
Figure 3:
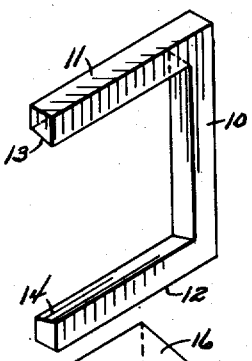
Figure 3 is a detail illustrating the mounting frame for holding one of the stabilizing shoes in the sides of the journal box.

Referring now to the drawing wherein like reference characters denote corresponding parts the railway car journal box stabilizing shoe of this invention includes a substantially U-shaped frame having a cross bar or base 10 with arms 11 and 12 extended from the ends thereof and with the arms formed with beveled inner surfaces 13 and 14, respectively, and a block of bearing material as indicated by the numeral 15 with the block having beveled side surfaces 16 and 17 that correspond with the surfaces 13 and 14 of the frame, and an arcuate surface 18 which is formed on a radius corresponding with the radius of a flange *or end collar* 19 on the end of an axle 20.

With the parts formed in this manner the U-shaped frames are secured to the inner surfaces of side walls 21 and 22 of a journal box 23 and with the frames positioned as illustrated in Fig. 1 the bearing blocks or shoes 15 are positioned to contact the peripheral surface of the flange 19.

Figure 4:
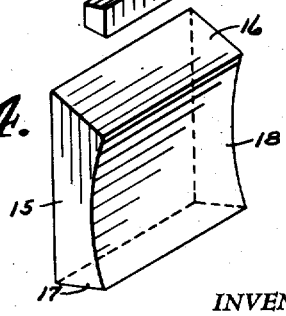
Figure 4 is a detail showing one of the stabilizing shoes.

As illustrated in Figure 4 the shoes or blocks 15 are positioned with the lower sections thereof below the center of the axle longer than the upper sections whereby the lower sections extend in under the axle and prevent upward movement of the journal box of an axle journaled in the box.

The frame for mounting the blocks or shoes in the journal box may be secured to the inner surfaces of the walls of the journal box by welding or other suitable means. It will also be understood that the mounting frames may be cast integral with the journal boxes and the shoes or bearing blocks may also be held by other means. The grooves for holding the stabilizing shoes may, therefore, be formed in the wall of the journal box in any suitable manner.

Although it is preferred to form the shoes of brass and the frames of steel it will be understood that the parts may be formed of other suitable materials.

It will also be understood that other modifications may be made in the design and arrangement of the parts without departing from the spirit of the invention.

What is claimed is:

1. In a stabilizing device for a railway car journal box, a pair of shoes each provided with beveled edges at their sides and an arcuate surface, a U-shaped frame including a cross-bar having arms extending therefrom, said arms each having beveled inner surfaces, said frame adapted to be secured to the inner surface of a journal box and the beveled surfaces of the arms adapted to receive corresponding beveled edges at the sides of the shoes.

2. In a stabilizing device for a railway car journal box in which an axle having a projecting end collar is journalled, a pair of shoes each provided with beveled edges at their sides and an arcuate surface, a U-shaped frame including a crossbar having arms extending therefrom, said arms each having beveled inner surfaces, said frame adapted to be secured to the inner surface of a journal box and the beveled surfaces of the arms adapted to receive corresponding beveled edges at the sides of the shoes, said shoes contacting the projecting end collar of the axle at and below the horizontal center of the axle, [the major portion of the shoes extending below the horizontal center of the axle] *the lower sections of the shoes below the level of the center of the axle being longer than the upper sections of the shoes whereby the lower sections of the shoes extend in under a portion of the axle and prevent upward movement of the journal box of an axle journaled in the box.*

*3. In a stabilizing device for a railway car journal box in which an axle having a projecting end collar is journaled, a pair of shoes spaced apart horizontally and each provided with upper and lower edges and an arcuate concave surface extending between said edges, an individual U-shaped frame associated with each shoe and including a single upright cross bar and horizontal arms extending therefrom in a direction generally lengthwise of and parallel to said shoe edges, said arms each having a shoe edge-engaging surface, each of said frames adapted to be secured to the inner surface of a journal box, said shoes contacting the periphery of the projecting end collar of the axle at and below the level of the horizontal center of the axle.*

*4. In combination with a railway axle having a journal, there being an end collar at the outer end of the journal projecting radially from the journal, a bearing on said journal, and a journal box enclosing said journal and bearing and supported upon said bearing and having side walls at opposite sides of the journal, a pair of shoes spaced from the bearing forming periphery of the journal and fitting snugly between the collar periphery and the box side walls and transmitting horizontal thrusts between the journal collar and the box side walls, said shoes being secured to the box side walls against movement downwardly thereof and having concave arcuate surfaces extending inwardly and under the collar periphery and preventing upward movement of the box and bearing from the journal.*

*5. A stabilizing device for a railway journal box and an axle journal having a bearing-supporting periphery and an end collar projecting radially therefrom, comprising a block-like member having a journal collar-opposing arcuate face concave from top to bottom of the member with the radius of the concave face equal to the radius of the journal collar to which the device is to be applied, a U-shaped frame constructed and arranged for attachment to the inner side wall of the box to which the device is to be applied and having an upright cross bar and vertically spaced horizontal legs extending therefrom lengthwise of said member concave face and spaced apart vertically to receive said member between them and to support the member against relative vertical movement in the frame.*

*6. In combination with a railway axle having a journal with a bearing-supporting periphery, there being an end collar at the outer end of the journal projecting radially therefrom, a bearing on said periphery, and a journal box enclosing said journal and bearing and supported upon said bearing and having side walls at opposite sides of the journal and having an opening in its front ends, a pair of shoes spaced from the said periphery and positioned between said collar and the box side walls to transmit horizontal thrusts between said collar and the box side walls and fitting a lower portion of the collar, and a member secured to each box side wall and mounting the corresponding shoe upon the box side wall and comprising a U-shaped member with an upright cross bar against the box side wall and horizontal elongated arms extending therefrom along the box side wall toward the front of the box, said arms engaging the top and bottom faces of the corresponding shoe and holding it against vertical movement relative to the box side wall but accommodating the removal and replacement of the shoe through the front end of the box.*

References Cited in the file of this patent or the original patent

UNITED STATES PATENTS

| | | |
|---|---|---|
| 701,065 | Magee | May 27, 1902 |
| 1,941,486 | Pilcher | Jan. 2, 1934 |
| 1,967,512 | Pilcher | July 24, 1934 |